US012699393B2

(12) United States Patent
Yasui

(10) Patent No.: US 12,699,393 B2
(45) Date of Patent: Aug. 4, 2026

(54) IMAGE PROCESSING DEVICE, IMAGE PROCESSING METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 18/125,841

(22) Filed: Mar. 24, 2023

(65) Prior Publication Data

US 2023/0341867 A1     Oct. 26, 2023

(30) Foreign Application Priority Data

Mar. 29, 2022    (JP) .................................. 2022-053683

(51) Int. Cl.
*G05D 1/244*          (2024.01)
*G05D 1/00*           (2024.01)
(Continued)

(52) U.S. Cl.
CPC ........... *G05D 1/0253* (2013.01); *G05D 1/244* (2024.01); *G06V 20/588* (2022.01);
(Continued)

(58) Field of Classification Search
CPC .... G05D 1/0253; G05D 1/244; G06V 20/588; B60W 2552/53; B60W 60/001; B60W 2420/403
(Continued)

(56) References Cited

U.S. PATENT DOCUMENTS

| | | | |
|---|---|---|---|
| 2015/0262020 A1 | 9/2015 | Kataoka | |
| 2016/0055383 A1 | 2/2016 | Akamine et al. | |

(Continued)

FOREIGN PATENT DOCUMENTS

| | | |
|---|---|---|
| CN | 108009524 | 5/2018 |
| CN | 112130550 | 12/2020 |

(Continued)

OTHER PUBLICATIONS

Ardalan Vahidi, Recursive Least Squares with Forgetting for Online Estimation of Vehicle Mass and Road Grade: Theory and Experiments, 2005, International Journal of Vehicle Mechanics and Mobility, Vehicle System Dynamics vol. 43 (Year: 2005).*

(Continued)

*Primary Examiner* — Matthias S Weisfeld
(74) *Attorney, Agent, or Firm* — Amin, Turocy & Watson, LLP

(57)          ABSTRACT

An image processing device sets an initial value of at least one of parameters of a function that approximates a road boundary in an image representing an area in front of a mobile object, captured by a camera mounted on the mobile object, on the basis of identification values of other parameters among the parameters, iteratively updates the parameters at a predetermined time point on the basis of the parameters at a previous time point to the predetermined time point and constraint conditions set for the parameters, and executes driving control or driving assistance of the mobile object on the basis of the road boundary approximated by the function that has the updated parameters.

7 Claims, 6 Drawing Sheets

(51) Int. Cl.
 *G06V 20/56* (2022.01)
 *B60W 60/00* (2020.01)
(52) U.S. Cl.
 CPC ..... *B60W 60/001* (2020.02); *B60W 2420/403* (2013.01); *B60W 2552/53* (2020.02)
(58) Field of Classification Search
 USPC .......................................................... 701/1
 See application file for complete search history.

(56) References Cited

U.S. PATENT DOCUMENTS

| | | | | |
|---|---|---|---|---|
| 2018/0373941 A1* | 12/2018 | Kwant | ................. | G08G 1/0145 |
| 2019/0146520 A1 | 5/2019 | Naithani et al. | | |
| 2019/0202453 A1* | 7/2019 | Farooqi | ................ | B60W 40/112 |
| 2020/0082182 A1* | 3/2020 | Lee | ........................ | G06N 3/0464 |
| 2020/0394422 A1* | 12/2020 | Bu | .......................... | G06V 10/50 |
| 2024/0105060 A1* | 3/2024 | Andreetto | .............. | G08G 1/163 |

FOREIGN PATENT DOCUMENTS

| | | | | | |
|---|---|---|---|---|---|
| CN | 112883853 A | * | 6/2021 | ............. | G06N 3/045 |
| EP | 3285243 | | 2/2018 | | |
| JP | 2006-018688 | | 1/2006 | | |
| JP | 2012-073924 | | 4/2012 | | |
| JP | 2015-172903 | | 10/2015 | | |
| JP | 2021-060885 | | 4/2021 | | |
| JP | 2022-507226 | | 1/2022 | | |
| KR | 10-2015-0124889 | | 11/2015 | | |
| WO | 2019/228211 | | 12/2019 | | |
| WO | WO-2023000337 A1 | * | 1/2023 | ............. | G01C 11/00 |

OTHER PUBLICATIONS

Jingwei Cao, Lane Detection Algorithm for Intelligent Vehicles in Complex Road Conditions and Dynamic Environments, Jul. 18, 2019, MDPI Sensors (Year: 2019).*
Chinese Office Action for Chinese Patent Application No. 202310294778.7 mailed Nov. 11, 2025.
Japanese Office Action for Japanese Patent Application No. 2022-053683 mailed Jan. 6, 2026.
Chinese Office Action for Chinese Patent Application No. 202310294778.7 mailed Mar. 28, 2026.
Li Yusheng, "Research on Lane Detection and Tracking of Self-driving Technology Based on Data Fusion", China Master's Theses Full-text Database Engineering Science and Technology, Series II, 07th term.

* cited by examiner

| |
|---|
| ~100 |
| ~10 CAMERA |
| ~20 DISPLAY UNIT |
| ~110 CANDIDATE POINT EXTRACTION UNIT |
| ~120 MODEL PARAMETER UPDATING UNIT |
| ~130 DRIVING CONTROL UNIT | x COORDINATE

DMN OUTPUT
(OUTPUT PROBABILITY
VALUE INDICATING
EXISTENCE OF
TRACK BOUNDARY
FOR EACH PIXEL)

0.8 y COORDINATE

DNN OUTPUT x'(k)  :  x'(1,k)  x'(2,k)  ⋯  x'(n,k)  ⋯  x'(N(k),k)

DNN OUTPUT y'(k)  :  y'(1,k)  y'(2,k)  ⋯  y'(n,k)  ⋯  y'(N(k),k)

REARRANGE IN DESCENDING
ORDER OF PROBABILITY VALUE

DNN OUTPUT x(k)  :  x(1,k)  x(2,k)  ⋯  x(n,k)  ⋯  x(N(k),k)

DNN OUTPUT y(k)  :  y(1,k)  y(2,k)  ⋯  y(n,k)  ⋯  y(N(k),k)

IMAGE PROCESSING DEVICE, IMAGE PROCESSING METHOD, AND STORAGE MEDIUM

CROSS-REFERENCE TO RELATED APPLICATION

Priority is claimed on Japanese Patent Application No. 2022-053683, filed Mar. 29, 2022, the content of which is incorporated herein by reference.

BACKGROUND

Field of the Invention

The present invention relates to an image processing device, an image processing method, and a storage medium.

Description of Related Art

Conventionally, a technology of estimating a road marking on a road on which a vehicle travels and controlling the traveling of the vehicle on the basis of the estimated road marking is known. For example, Japanese Unexamined Patent Application, First Publication No. 2021-60885 discloses a technology of selecting a plurality of three-dimensional objects from an image captured by a camera mounted in a vehicle, estimating road markings on the basis of positions of the selected three-dimensional objects, and setting a target speed of the vehicle according to the curvature of the estimated road markings.

In the technology described in Japanese Patent Application, First Publication No. 2021-60885, road markings are estimated by fitting a curved line to a plurality of positions extracted from an image obtained by photographing a road on which a vehicle travels. However, in such a method, an error in the estimated road markings is large due to a restriction on a degree of freedom of the curve to be fitted, and blurring may occur in the estimated road markings due to a variation in the position extracted from the image at each time point. As a result, there are cases where the estimated road markings cannot be used stably for the traveling control of the vehicle.

SUMMARY

The present invention has been made in consideration of such circumstances, and an object thereof is to provide an image processing device, an image processing method, and a storage medium capable of estimating road markings that can be stably used for traveling control of a mobile object.

An image processing device, an image processing method, and a storage medium according to the present invention have adopted the following configurations.

(1): An image processing device according to one aspect of the present invention includes a storage medium configured to store an instruction readable by a computer and a processor that is connected to the storage medium, in which the processor executes an instruction readable by the computer, thereby setting an initial value of at least one of parameters of a function that approximates a road boundary in an image representing an area in front of a mobile object, captured by a camera mounted on the mobile object, on the basis of identification values of other parameters among the parameters, iteratively updating the parameters at a predetermined time point on the basis of the parameters at a previous time point to the predetermined time point and constraint conditions set for the parameters, and executing driving control or driving assistance of the mobile object on the basis of the road boundary approximated by the function that has the updated parameters.

(2): In the aspect of (1) described above, the function is a quadratic function, the hardware processor sets an initial value of a linear coefficient of the quadratic function on the basis of an identification value of the road boundary recognized in a lateral direction of the image, and the hardware processor iteratively updates the parameters at a predetermined time point by setting forgetting gains of secondary coefficients and the linear coefficients of the parameters at the previous time point to the predetermined time point to values smaller than 1.

(3): In the aspect of (1) described above, the hardware processor iteratively updates parameters of a function that approximates a road boundary by dividing the image at predetermined intervals, iteratively updating the parameters of the function that approximates the road boundary for each divided area, and combining the parameters.

(4): In the aspect of (1) described above, the hardware processor uses a learned model learned to output a probability value indicating an existence probability of a road boundary for each of coordinates of the image in response to an input of the image to acquire the probability value and update the parameters on the basis of the probability value and the coordinates.

(5): In the aspect of (4) described above, the hardware processor iteratively updates the parameters to minimize an error between a component of the coordinates in a first direction and an estimated value of the component in the first direction calculated on the basis of a component of the coordinates in a second direction.

(6): An image processing method according to another aspect of the present invention includes, by a computer, setting an initial value of at least one of parameters of a function that approximates a road boundary in an image representing an area in front of a mobile object, captured by a camera mounted on the mobile object, on the basis of identification values of other parameters among the parameters, iteratively updating the parameters at a predetermined time point on the basis of the parameters at a previous time point to the predetermined time point and constraint conditions set for the parameters, and executing driving control or driving assistance of the mobile object on the basis of the road boundary approximated by the function that has the updated parameters.

(7): A computer-readable non-transitory storage medium according to still another aspect of the present invention stores a program causing a computer to execute setting an initial value of at least one of parameters of a function that approximates a road boundary in an image representing an area in front of a mobile object, captured by a camera mounted on the mobile object, on the basis of identification values of other parameters among the parameters, iteratively updating the parameters at a predetermined time point on the basis of the parameters at a previous time point to the predetermined time point and constraint conditions set for the parameters, and executing driving control or driving assistance of the mobile object on the basis of the road boundary approximated by the function that has the updated parameters.

According to (1) to (7), it is possible to estimate road markings that can be stably used for traveling control of a mobile object.

BRIEF DESCRIPTION OF THE DRAWINGS

FIG. 6 is a diagram which shows an example of a flow of model parameter update processing executed by a model parameter updating unit.

FIG. 8 is a sequence diagram which shows an example of a flow of processing executed by the image processing device.

DESCRIPTION OF EMBODIMENT

Hereinafter, embodiments of an image processing device, an image processing method, and a storage medium of the present invention will be described with reference to the drawings. In the present embodiment, the image processing device is, for example, a terminal device such as a smartphone having a camera and a display. However, the present invention is not limited to such a configuration, and the image processing device may be a computer device as long as it receives at least an image captured by a camera, processes it, and outputs a result of the processing to a display. In this case, functions of the present invention are realized by the camera, the display, and the image processing device in cooperation.

[Configuration]

Figures 1, 2:
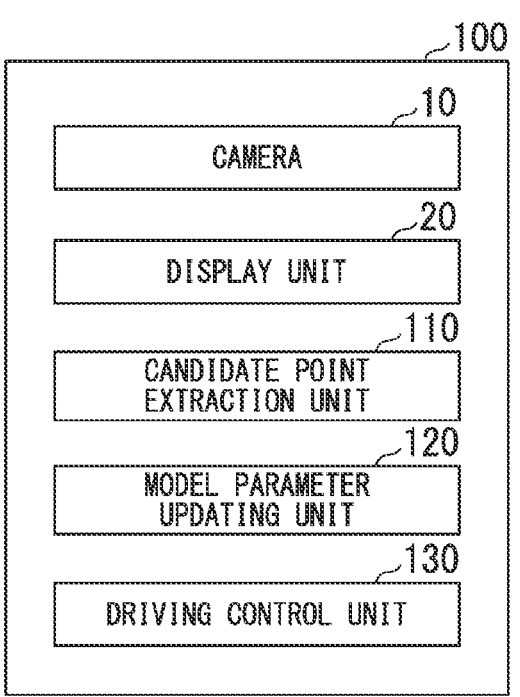
FIG. 1 is a diagram which shows an example of an environment in which an image processing device mounted in a host vehicle M is used.
FIG. 2 is a diagram which shows an example of a configuration of the image processing device.

FIG. 1 is a diagram which shows an example of an environment in which an image processing device 100 mounted in a host vehicle M is used. The host vehicle M is, for example, a two-wheeled, three-wheeled, or four-wheeled vehicle, and its drive source is an internal combustion engine such as a diesel engine or a gasoline engine, an electric motor, or a combination thereof. The electric motor operates using electric power generated by a generator connected to the internal combustion engine, or electric power discharged from a secondary battery or a fuel cell.

As shown in FIG. 1, the image processing device 100 is installed in the host vehicle M so that the camera 10 can capture an image of an area in front of the host vehicle M in a traveling direction. The image processing device 100 is held by, for example, an in-vehicle holder (not shown) attached to a dashboard of the host vehicle M, and captures an image of the area in front of the host vehicle M. The host vehicle M is an example of a "mobile object." In the following description, in the present embodiment, an example in which the image processing device 100 is mounted in the host vehicle M, which is a mobile object, is described, but more generally, the mobile object includes devices with cameras mounted in a vehicle such as dash cameras and smartphones.

FIG. 2 is a diagram which shows an example of a configuration of the image processing device 100. As shown in FIG. 2, the image processing device 100 includes, for example, a camera 10, a display unit 20, a candidate point extraction unit 110, a model parameter updating unit 120, and a driving control unit 130. The candidate point extraction unit 110, the model parameter updating unit 120, and the driving control unit 130 are realized by a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), and a graphics processing unit (GPU) or by software and hardware in cooperation. The program may be stored in advance in a storage device (a storage device having a non-transitory storage medium) such as a hard disk drive (HDD) or flash memory, or may be stored in a removable storage medium (a non-transitory storage medium) such as a DVD or CD-ROM and may be installed by the storage medium being attached to a drive device. The camera 10 is, for example, a digital camera using a solid-state imaging device such as a charge coupled device (CCD) or complementary metal oxide semiconductor (CMOS). The display unit 20 is, for example, a display device such as a touch panel or liquid crystal display.

[Extraction of Candidate Point]

Figure 3:
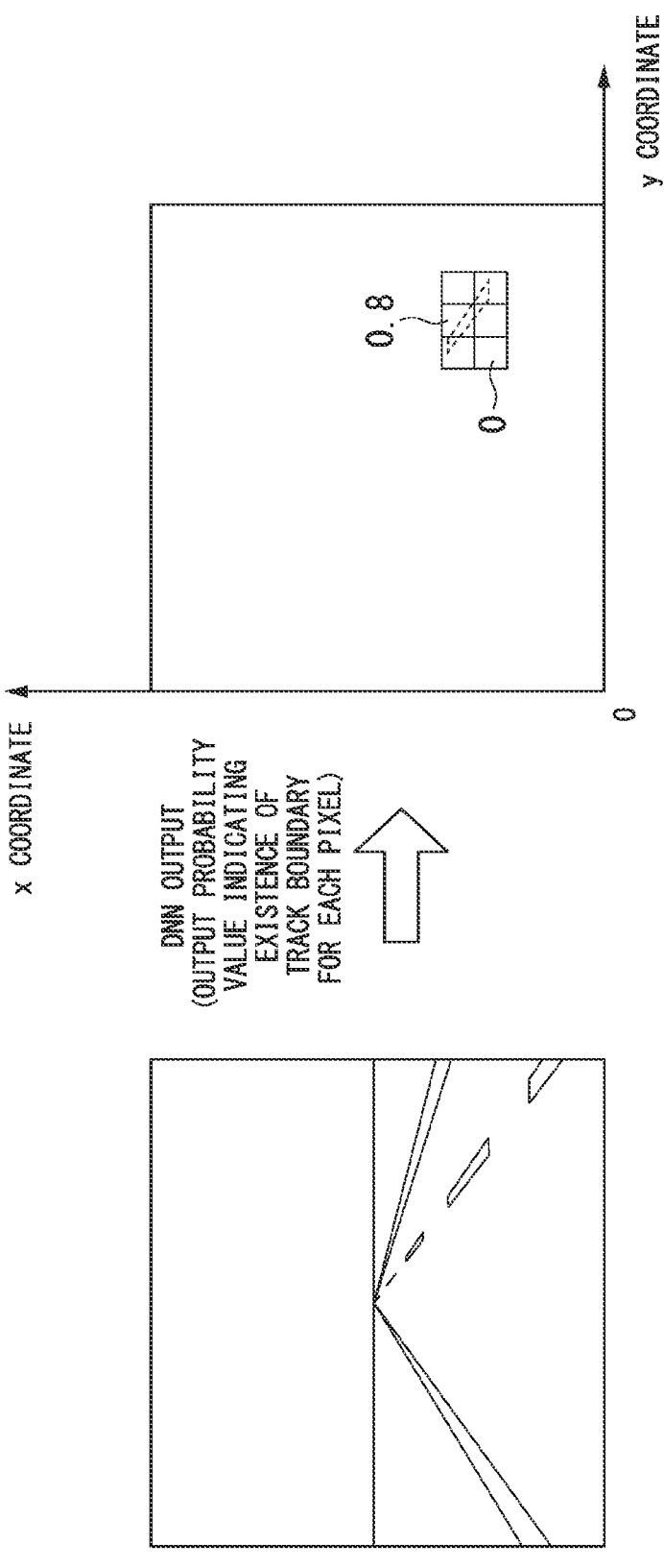
FIG. 3 is a diagram which shows an example of a method in which a candidate point extraction unit extracts candidate points on a track boundary.

The candidate point extraction unit 110 extracts candidate points of a boundary of a track (a track boundary) on which the host vehicle M travels on the basis of an image representing the area in front of the host vehicle M captured by the camera 10. FIG. 3 is a diagram which shows an example of a method in which the candidate point extraction unit 110 extracts candidate points on a track boundary. As shown in FIG. 3, when the candidate point extraction unit 110 acquires an image captured by the camera 10, it inputs the acquired image into a learned model (deep neural network: DNN) that has been learned to output a probability value (0 or more and 1 or less) indicating whether each pixel (coordinates) of the image is a track boundary according to the input of the image. The candidate point extraction unit 110 extracts pixels for which the output probability values take positive values as candidate points of the track boundary. Alternatively, the candidate point extraction unit 110 may also extract pixels for which the output probability values are equal to or greater than a threshold value (for example, 0.5) as candidate points of the track boundary.

[Update of Model Parameter]

Figure 4:
FIG. 4 is a diagram which shows an example of a method for rearranging candidate points on a track boundary.

The model parameter updating unit 120 rearranges the candidate points of the track boundary extracted by the candidate point extraction unit 110 in descending order of the probability value, and uses the candidate points of the track boundary in descending order of the probability value to update model parameters of a track boundary model to be described below. FIG. 4 is a diagram which shows an example of a method of rearranging the candidate points of a track boundary. In FIG. 4, k indicates a time point in a recognition cycle for recognizing a track boundary, N(k) indicates the number of candidate points of the track boundary acquired at the time point k, $x'(n,k)$ indicates an x-coordinate of each candidate point before rearrangement, $y'(n,k)$ indicates a y-coordinate of each candidate point before rearrangement, $x(n,k)$ indicates an x-coordinate of each candidate point after rearrangement, and $y(n,k)$ indicates a y-coordinate of each candidate point after rearrangement. As will be described below, by iteratively updating the model parameters of the track boundary model using the candidate points of the track boundary in descending order of the probability value, even if down-sampling occurs within one recognition cycle, it is possible to output a track boundary model with high accuracy even in a shorter time.

Figure 5:
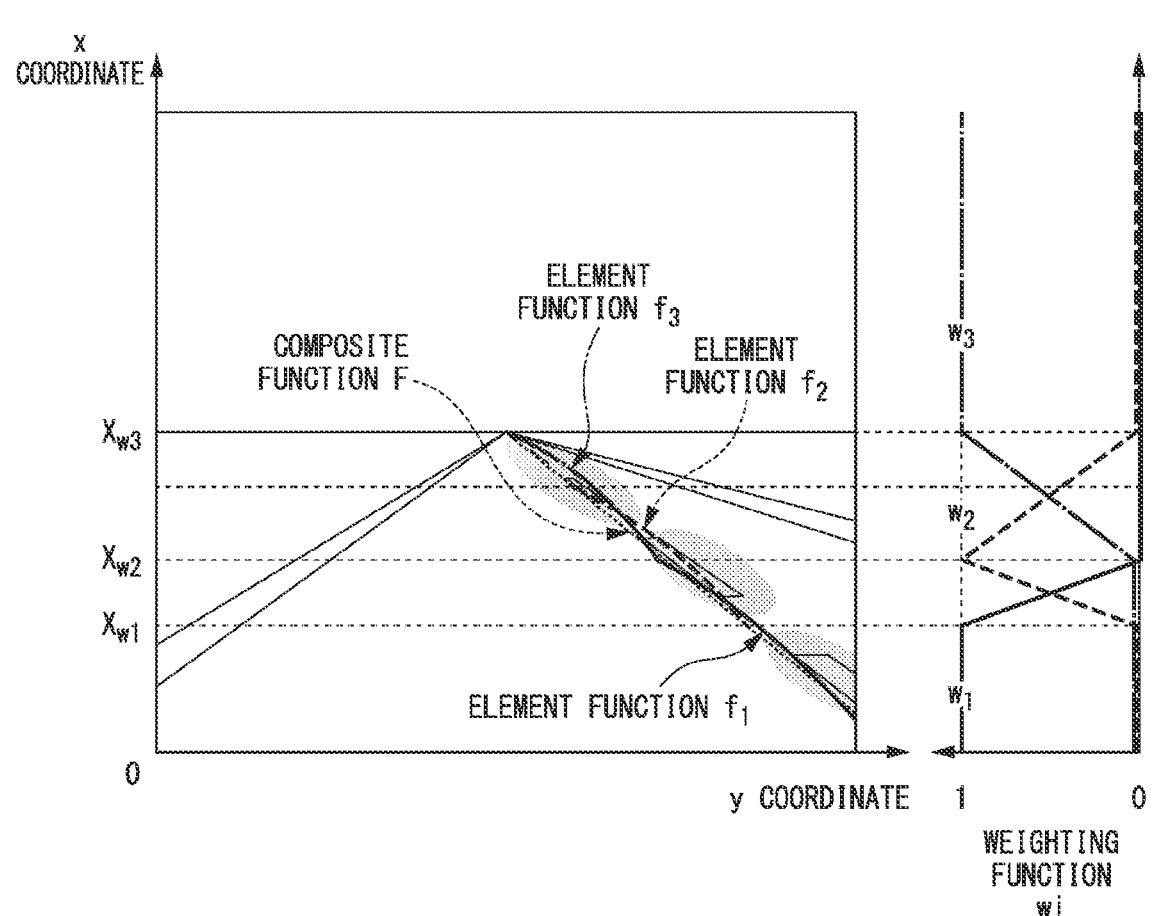
FIG. 5 is a diagram for describing an outline of a track boundary model updated by a model parameter updating unit.

FIG. 5 is a diagram for describing an outline of the track boundary model updated by the model parameter updating unit 120. The model parameter updating unit 120 obtains an estimated value $y_{\_hat}(n,k)$ of the track boundary by iteratively substituting the candidate points of the track boundary rearranged in descending order of the probability value into the track boundary model defined by the following Equation (1).

functions are combined to obtain a final approximation curve in the present embodiment, so that the track boundary in the image can be expressed with higher accuracy.

Note that, in the present embodiment, values and the number of x-coordinates $x_{wi}$ (i=1 to m) for dividing the area are fixed values set in advance. However, the present invention is not limited to such a configuration, and the values and number of x-coordinates $x_{wi}$ for dividing the area may be set Equation (1)

$$y_{\_hat}(n, k) = \sum_{i=1}^{m} w_i(x(n, k))\big(a_i(n, k)x(n, k)^2 + b_i(n, k)x(n, k) + c_i(n, k)\big)(i = 1 \sim m)$$

$$= \sum_{i=1}^{m} w_i(x(n, k))\theta_i(n, k)^T \zeta(n, k)$$

$$= \sum_{i=1}^{m} w_i(x(n, k))y_{\_hat\_i}(n, k)$$

$$= \theta_i(n, k)^T \zeta(n, k)$$

In Equation (1), $a_i(n,k)$, $b_i(n,k)$, and $c_i$ (n,k) represent a second order coefficient, a first order coefficient, and a constant term of a quadratic function (which may be referred to hereinafter as an "element function") that approximates a track boundary in an image, respectively, and $w_i$ represents a weighting function that outputs a weight of 0 or more and 1 or less according to an x-coordinate of the input candidate point. More specifically, the weighting function is defined by the following Equations (2) to (4). In Equations (2) to (4), the values of $x_{wi}$ (i=1 to m) are fixed values set in advance. A sum of $w_i(x)$ (i=1 to m) is set to always be one.

$$w_1(x) = \begin{cases} 1 & (x(k) \leq x_{w1}) \\ \dfrac{x_{w2} - x(k)}{x_{w2} - x_1} & (x_{w1} < x(k) < x_{w2}) \ (i = 1) \\ 0 & (x_{w2} \leq x(k)) \end{cases}$$ Equation (2)

$$w_i(x) = \begin{cases} 0 & (x(k) \leq x_{wi-1}) \\ \dfrac{x(k) - x_{wi-1}}{x_{wi} - x_{wi-1}} & (x_{wi-1} < x(k) \leq x_{wi}) \\ \dfrac{x_{wi-1} - x(k)}{x_{wi+1} - x_{wi}} & (x_{wi} < x(k) < x_{wi+1}) \\ 0 & (x_{wi+1} \leq x(k)) \end{cases} (i = 1)$$ Equation (3)

$$w_m(x) = \begin{cases} 0 & (x(k) \leq x_{wm-1}) \\ \dfrac{x(k) - x_{wm-1}}{x_{wm} - x_{wm-1}} & (x_{wm-1} < x(k) < x_{wm}) \ (i = m) \\ 1 & (x_{wm} \leq x(k)) \end{cases}$$ Equation (4)

FIG. 5 shows element functions $f_1$, $f_2$, $f_3$ and weighting functions $w_1$, $w_2$, $w_3$ when m=3 in equations (1) to (4). That is, the track boundary model in the present embodiment divides an image into a plurality of areas based on the x-coordinate, approximates a track boundary by a quadratic function for each divided area, and approximates the track boundary in the entire image by combining the quadratic function for each area.

In this manner, compared to a conventional method (a least-squares method of a batch calculation method) in which the candidate points of a track boundary in an image are approximated by a single quadratic function, the track boundary is approximated by a quadratic function for each partial area of the image, and the approximated quadratic as, for example, the number of clusters obtained by clustering the extracted candidate points and boundary points thereof.

Figure 6:
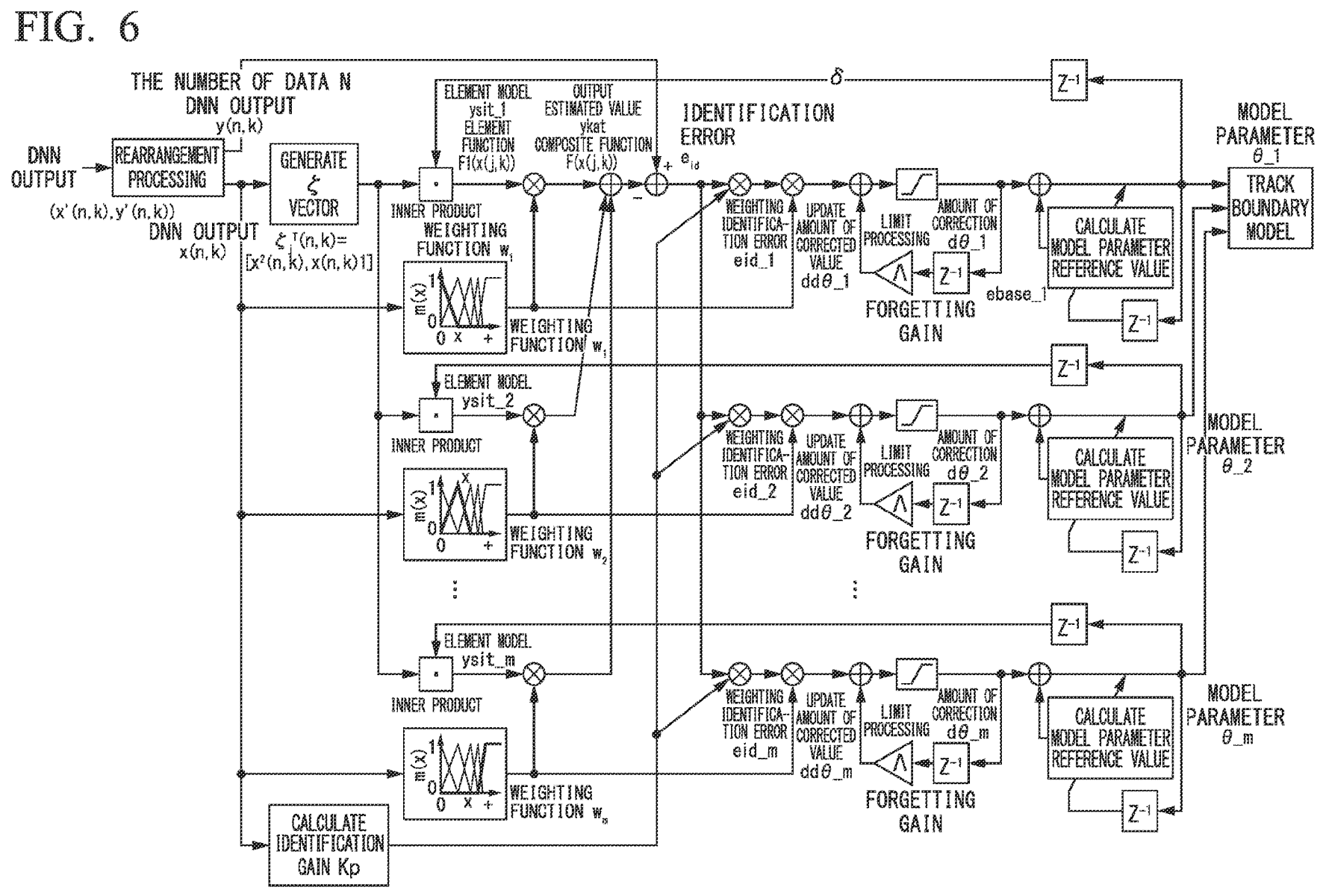

Next, model parameter update processing executed by the model parameter updating unit 120 will be described with reference to FIG. 6. FIG. 6 is a diagram which shows an example of a flow of the model parameter update processing executed by the model parameter updating unit 120.

First, the model parameter updating unit 120 rearranges the candidate points (x'(n,k) and y'(n,k)) of the track boundary extracted by the candidate point extraction unit 110 in descending order of the probability value, and obtains candidate points (x(n,k) and y(n,k)). The model parameter updating unit 120 generates a vector $\xi(n,k)=[x(n,k)^2, x(n,k), 1]$ based on the candidate point x(n,k), and substitutes x(n,k) into the weighting function $w_i$ to obtain a weighting value $w_i(x(n,k))$.

Next, the model parameter updating unit 120 calculates an inner product of the vetor $\xi(n,k)$ and model parameters $\theta_i(n,k)=[a_i(n,k), b_i(n,k), c_i(n,k)]$ and multiplies it by the weighting value $w_i(x(n,k))$, thereby obtaining element functions $f_i(x)=w_i(x(n,k))(a_i(n,k)\times(n,k)^2+b_i(n,k)\times(n,k)+c_i(n,k))$ for each area. The model parameter updating unit 120 obtains an output estimated value $y_{\_hat}(n,k)$ represented by Equation (1) by taking a sum of the elemental functions $f_i(x)$ for each area. Initial values of the model parameters $\theta_i(n,k)=[a_i(n,k), b_i(n,k), c_i(n,k)]$ to be multiplied at this time will be described below.

The model parameter updating unit 120 then calculates an identification error between the output estimated value $y_{\_hat}(n,k)$ and a y-coordinate y(n,k) of a candidate point as $e_{id}(n,k)=w_i(x(n,k))(y(n,k)-y_{\_hat}(n,k))$. The identification error can be reflected for each area by multiplying the error between the output estimated value $y_{\_hat}(n,k)$ and the y-coordinate y(n,k) of the candidate point by the weighting value $w_i$ (x(n,k)). The model parameter updating unit 120 defines an adaptive gain $K_p$ for correcting the model parameter $\theta_i(n,k)$ in a direction of decreasing a squared error of the identification error $e_{id}$ (n,k) by the following Equation (5).

$$K_p(n, k) = \frac{P'(n-1, k)\zeta(n, k)}{1 + \zeta(n, k)^T P'(n-1, k)\zeta((n, k)} \qquad \text{Equation (5)}$$

In Equation (5), P'(n,k) represents a covariance matrix of 3 rows and 3 columns and is a matrix defined by Equation (6) below.

$$P'(n, k) = \frac{1}{\lambda_1}\left[I - \frac{\lambda_2 P'(n-1, k)\zeta(n, k)\zeta(n, k)^T}{\lambda_1 + \lambda_2\zeta(n, k)^T P'(n-1, k)\zeta(n, k)}\right]P' \qquad \text{Equation (6)}$$

$$(n-1, k)$$

In Equation (6), I represents a unit matrix of 3 rows and 3 columns, and $\lambda_1$ and $\lambda_2$ represent setting parameters of an iterative identification algorithm. $\lambda_1$ and $\lambda_2$ are constant values greater than 0 and equal to or less than 1. They are set as $\lambda_1=1$ and $\lambda_2=1$ when a least squares method is applied, set as $\lambda_1=\lambda(0<\lambda\leq1)$ 1 and $\lambda_2=1$ when a weighted least squares method is applied, and set as $\lambda_1=1$ and $\lambda_2=0$ when a fixed gain method is applied. When the fixed gain method is applied, the adaptive gain $K_p$ is represented by the following Equations (7) and (8).

$$K_p(n, k) = \frac{P\zeta(n, k)}{1 + \zeta(n, k)^T P\zeta(n, k)} \qquad \text{Equation (7)}$$

$$P = \begin{bmatrix} P_1 & 0 & 0 \\ 0 & p_2 & 0 \\ 0 & 0 & p_3 \end{bmatrix} \qquad \text{Equation (8)}$$

In Equation (8), P represents an identification gain matrix. $P_1$, $P_2$, and $P_3$ represent identification gains and are positive fixed values. The model parameter updating unit 120 multiplies the identification error $e_{id}(n,k)$ by the adaptive gain $K_p$, thereby obtaining a correction amount $dd\theta_i(n,k)$ of the model parameter represented by the following equation (9).

$$dd\theta_i(n,k) = K_p(n,k)e_{id\_i}(n,k) \ (i=1\sim m) \qquad \text{Equation (9)}$$

Next, the model parameter updating unit 120 multiplies a previous value $d\theta_i(n-1,k)$ of the final correction amount, which will be described below, by a forgetting gain $\Delta_{fgt}$, and adds the obtained multiplied value to the correction amount $dd\theta_i(n,k)$ of the model parameter of Equation (9), thereby obtaining a correction amount $d\theta_{raw\_i}(n,k)$ of the model parameter represented by the following Equation (10). In this manner, by defining the correction amount $d\theta_{raw\_i}(n,k)$ using a value obtained by multiplying the final correction amount $d\theta_i(n-1,k)$ previously obtained by the forgetting gain $\Delta_{fgt}$, abrupt fluctuations of the track boundary model can be curbed.

$$d\theta_{raw\_i}(n,k) = \Delta_{fgt}d\theta_i(n-1,k) + K_p(n,k)e_{id\_i}(n,k) \qquad \text{Equation (10)}$$

In Equation (10), the forgetting gain $\Delta_{fgt}$ is a diagonal matrix of 3 rows and 3 columns represented by the following Equation (11). In Equation (11), $\delta_{fgt\_1}$, $\delta_{fgt\_2}$, and $\delta_{fgt\_3}$ are constant values that satisfy $0<\delta_{fgt\_1}$, $\delta_{fgt\_2}<1$, and $\delta_{fgt\_3}=1$. That is, the forgetting gain $\Delta_{fgt}$ is set to apply a forgetting effect to $a_i(n,k)$ and $b_i(n,k)$.

$$\Delta_{fgt} = \begin{bmatrix} \delta_{fgt\_1} & 0 & 0 \\ 0 & \delta_{fgt\_2} & 0 \\ 0 & 0 & \delta_{fgt\_3} \end{bmatrix} \qquad \text{Equation (11)}$$

Next, the model parameter updating unit 120 performs limiter processing (an example of a "constraint condition") represented by the following Equations (12) to (14) on the correction amount $d\theta_{raw\_i}(n,k)$ of the model parameter to correct the correction amount of the model parameter and obtain a final correction amount $d\theta_i(n,k)$ represented by the following Equation (15). In Equations (12) to (14), $da_L$, $da_H$, $db_L$, $db_H$, $dc_L$, and $dc_H$ are fixed values set in advance, and are set to prevent the track boundary model from being in an unrealistic shape.

$$da_i(n, k) = \begin{cases} da_L(n, k) & (da_{raw\_i}(n, k) < da_L) \\ da_{raw\_i}(n, k) & (da_L \leqq da_{raw\_i}(n, k) \leqq da_H) \\ da_H(n, k) & (da_H < da_{raw\_i}(n, k)) \end{cases} \qquad \text{Equation (12)}$$

$$db_i(n, k) = \begin{cases} db_L(n, k) & (db_{raw\_i}(n, k) < db_L) \\ db_{raw\_i}(n, k) & (db_L \leqq db_{raw\_i}(n, k) \leqq db_H) \\ db_H(n, k) & (db_H < db_{raw\_i}(n, k)) \end{cases} \qquad \text{Equation (13)}$$

$$dc_i(n, k) = \begin{cases} dc_L(n, k) & (dc_{raw\_i}(n, k) < dc_L) \\ dc_{raw\_i}(n, k) & (dc_L \leqq dc_{raw\_i}(n, k) \leqq dc_H) \\ dc_H(n, k) & (dc_H < dc_{raw\_i}(n, k)) \end{cases} \qquad \text{Equation (14)}$$

$$d\theta_i(n, k) = \begin{bmatrix} da_i(n, k) \\ db_i(n, k) \\ dc_i(n, k) \end{bmatrix} \qquad \text{Equation (15)}$$

Next, the model parameter updating unit 120 adds a reference value $\theta_{base\_i}(n,k)$ of the model parameter represented by the following Equation (16) to the correction amount $d\theta_i(n,k)$, thereby obtaining a current model parameter value $\theta_i(n,k)$ represented by the following Equation (17). The calculated current model parameter value $\theta_i(n,k)$ is used as an identification value (an initial value) for calculating the model parameter $\theta_i(n+1,k)$ for a next input value $n+1$.

$$\theta_{base\_i}(n, k) = \begin{bmatrix} a_{base\_i}(n, k) \\ b_{base\_i}(n, k) \\ c_{base\_i}(n, k) \end{bmatrix} \qquad \text{Equation (16)}$$

$$\theta_i(n, k) = \theta_{base\_i}(n, k) + d\theta_i(n, k) \qquad \text{Equation (17)}$$

[Reference Value Calculation of Model Parameter]

Figure 7:
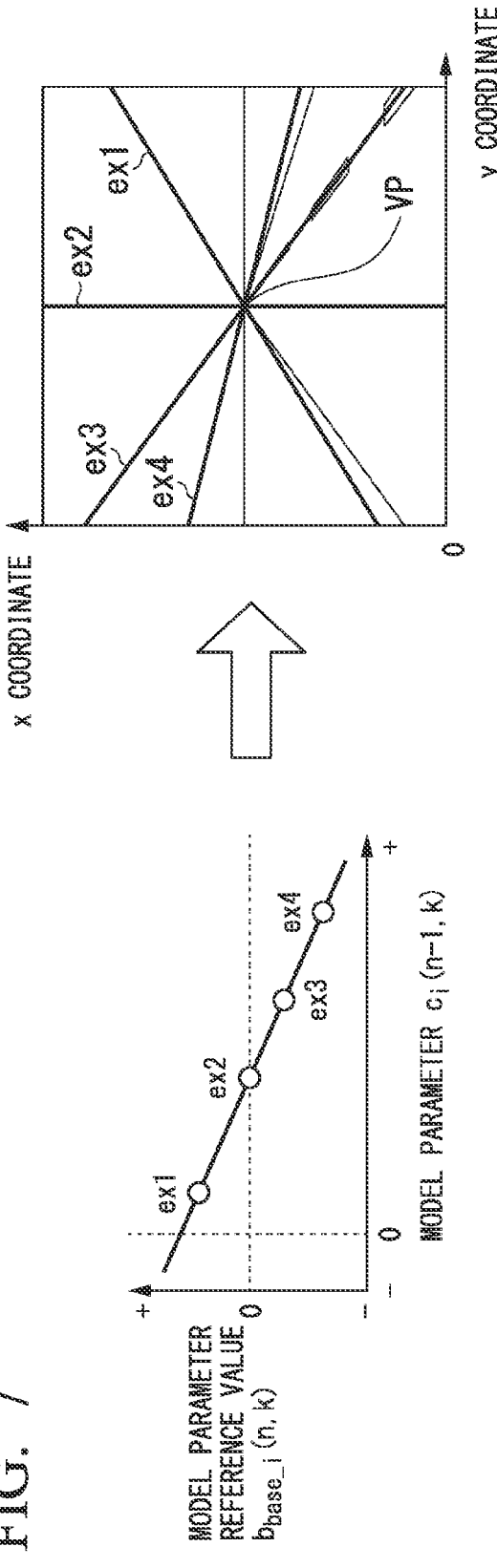
FIG. 7 is a graph for describing a method of calculating a reference value of a model parameter.

Next, a method for calculating the reference value $\theta_{base\_i}(n,k)$ of the model parameter will be described with reference to FIG. 7. FIG. 7 is a graph for describing a method of calculating a reference value of the model parameter. The model parameter updating unit 120 sets the reference value $\theta_{base\_i}(n,k)$ of the model parameter using the following Equations (18) to (20).

$$a_{base\_i}(n,k)=0 \qquad \text{Equation (18)}$$

$$c_{base\_i}(n,k)=0 \qquad \text{Equation (19)}$$

$$b_{base\_i}(n,k)=g(n-1,k)=\alpha c_i(n-1,k)+\beta \qquad \text{Equation (20)}$$

Equations (18) and (19) represent initial values of model parameters $a_{base\_i}(n,k)$ and $c_{base\_i}(n,k)$, respectively. As shown in Equations (18) and (19), since the track boundary model can be curved in both left and right directions, the initial value of the model parameter $a_{base\_i}(n,k)$ may be zero, and since a model parameter $c_i$ corresponding to a y-intercept of the track boundary model can be in both left and right directions, the initial value of the model parameter $c_{base\_i}(n,k)$ may be zero.

In Equation (20), $c_i(n-1,k)$ represents a previously calculated identification value of the model parameter $c_i$, and a function g represents a scaling function that gives a straight line passing through the identification value (that is, the y-intercept) of the model parameter $c_i$ and a vanishing point VP of an image. That is, as shown in a left part of FIG. 7, as the identification value $c_i$ $(n-1,k)$ takes a larger value, the reference value $b_{base\_i}(n,k)$ of the model parameter takes a smaller value, and, as shown in a right part of FIG. 7, the straight line inclines to the left. By setting the reference value $\theta_{base\_i}(n,k)$ of the model parameter using the methods described above, it is possible to prevent the track boundary model from being in an unrealistic shape even when the number of DNN output values N(k) in a certain recognition cycle is extremely small due to, for example, an event such as bad weather or dark visibility conditions.

When the model parameter updating unit 120 determines a track boundary model for each recognition cycle, the driving control unit 130 performs automated driving or driving assistance of the host vehicle M on the basis of the determined track boundary model. More specifically, for example, the driving control unit 130 performs bird's-eye view conversion on a track boundary model in a camera coordinate system to obtain a track boundary model in a bird's-eye view coordinate system. The driving control unit 130 generates a target trajectory and an action plan of the host vehicle M using the track boundary model in the bird's-eye view coordinate system, and causes the host vehicle M to travel according to the generated target trajectory and action plan. In addition, for example, the driving control unit 130 uses the track boundary model in the bird's-eye view coordinate system to assist with steering or to issue a warning such that the host vehicle does not deviate from the determined track boundary model when an occupant of the host vehicle M performs manual driving.

Figure 8:
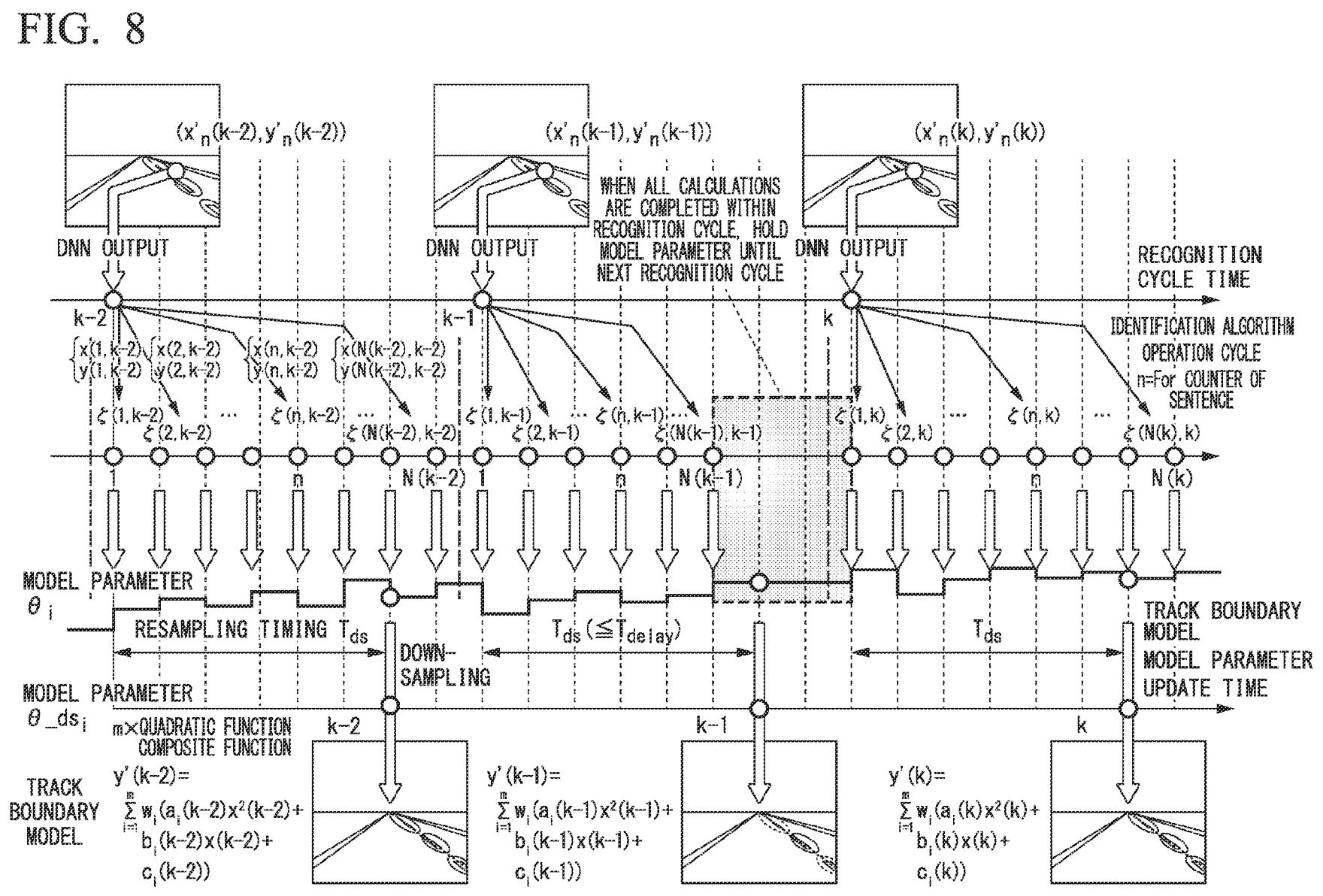

FIG. 8 is a sequence diagram which shows an example of a flow of processing executed by the image processing device 100. As shown in FIG. 8, at a time point k−2, the image processing device 100 rearranges DNN output values x'(1,k−2), y'(1,k−2), x'(2,k−2), y'(2,k−2), . . . , x'(N(k−2),k−2)), y'(N(k−2),N(k−2)) in descending order of the probability value, and obtains x(1,k−2), y(1,k−2), x(2,k−2), y(2,k−2), . . . , x(N(k−2), k−2), and y(N(k−2), k−2). The image processing device 100 constitutes a vector $\xi(n,k-2)=[x(n,k-2)^2, x(n,k-2), 1]$ in descending order of the probability value, and inputs it to the iterative identification algorithm as shown in FIG. 6 to iteratively update the model parameter values $\theta_i(n,k-2)$.

When a resampling timing $T_{ds}$ has elapsed while the model parameter value θi(n,k−2) is being updated, the image processing device 100 performs down-sampling on a model parameter value (for example, $\theta_i(N(k-2)-1,k-2)$) at a time when the resampling timing $T_{ds}$ has elapsed, and determines the result as the final model parameter value in a recognition cycle k−2. The image processing device 100 causes the display unit 20 to display a track boundary model set with the determined model parameter value $\theta_i(N(k-2)-1,k-2)$. As described above, unlike the least-squares method of the batch calculation method, in the present embodiment, the model parameter value $\theta_i(n,k)$ is iteratively updated by using the output values in descending order of the probability value, thereby it is possible to estimate a track boundary model with high accuracy even when the data amount is large and calculation cannot be completed by the least-squares method of the batch calculation method.

The image processing device 100, in a recognition cycle k−1, rearranges DNN output values x'(1,k−1), y'(1,k−1), x'(2,k−1), y'(2,k−1), . . . , x'(N(k−1),k−1), y'(N(k−1),k−1) in descending order of the probability value, and obtains x(1, k−1), y(1,k−1), x(2,k−1), y(2,k−1), . . . , x(N(k−1),k−1), and y(n(k−1),k−1). The image processing device 100 constitutes a vector $\xi(n,k-1)=[x(n,k-1)^2, x(n,k-1), 1]$ in descending order of the probability value, and updates the model parameter value $\theta_i(n,k-1)$ by inputting it to the iterative identification algorithm as shown in FIG. 6. At this time, the image processing device 100 uses the model parameter value $\theta_i(N(k-2)-1,k-2))$ determined in a recognition cycle k−2, as an initial value for calculating the estimated value $y_{\_hat}(1, k-1)$. When the model parameter value $\theta_i(n,k-1)$ has been updated to the output values of x(N(k−1),k−1) and y(N(k−1),k−1), the image processing device 100 holds the model parameter value $\theta_i(N(k-1),k-1)$ until a next recognition cycle k, and causes the display unit 20 to display a track boundary model with the held model parameter value $\theta_i(N(k-1),k-1)$ set. Thereafter, in the recognition cycle k, the image processing device 100 similarly updates the model parameter value $\theta_i(n,k)$ by using DNN output values x'(1,k), y'(1,k), x'(2,k), y'(2,k), . . . , x'(N(k),k), and y'(N(k),k). At this time, the image processing device 100 uses the model parameter value $\theta_i(N(k-1),k-1)$ determined in the recognition cycle k−1 as an initial value for calculating the estimated value $y_{\_hat}(1,k)$.

According to the present embodiment described above, the image processing device divides an area in front of a host vehicle on a coordinate system based on the host vehicle at predetermined intervals, generates a function for approximating a road marking in each area on the basis of a probability value indicating an existence probability of the road marking for each of coordinates in each area obtained by the division and corresponding coordinates, and generates a function that approximates a road marking in the front area by combining the functions generated for each area. As a result, it is possible to estimate road markings that can be stably used for traveling control of mobile objects.

The embodiment described above can be expressed as follows.

An image processing device includes a storage medium that stores an instruction readable by a computer and a processor that is connected to the storage medium, in which the processor executes an instruction readable by the computer, thereby setting an initial value of at least one of parameters of a function that approximates a road boundary in an image representing an area in front of a mobile object, captured by a camera mounted on the mobile object, on the basis of identification values of other parameters among the parameters, iteratively updating the parameters at a predetermined time point on the basis of the parameters at a previous time point to the predetermined time point and constraint conditions set for the parameters, and executing driving control or driving assistance of the mobile object on the basis of the road boundary approximated by the function that has the updated parameters.

As described above, a mode for implementing the present invention has been described using the embodiments, but the present invention is not limited to such embodiments at all, and various modifications and replacements can be added within a range not departing from the gist of the present invention.

What is claimed is:

1. An image processing device comprising:

a storage medium configured to store an instruction readable by a computer and a hardware processor that is connected to the storage medium, wherein the hardware processor executes the instruction readable by the computer, thereby setting an initial value of at least one parameter of a group of initial parameters associated with a function that approximates a road boundary in an image representing an area in front of a mobile object based on a scaling function that gives a straight line passing through an identification value associated with an other parameter of the group of initial parameters and a vanishing point of the image, wherein the image is captured by a camera mounted on the mobile object;

iteratively updating, as a group of updated parameters, the group of initial parameters at a predetermined time point based on a group of previous parameters at a previous time point to the predetermined time point and constraint conditions set for the group of previous parameters; and executing driving control or driving assistance of the mobile object based on the road boundary approximated by the function that is associated with the group of updated parameters, wherein the hardware processor iteratively updates the group of initial parameters associated with the function that approximates the road boundary by dividing the image at predetermined intervals into areas in a vehicle travel direction, iteratively updating the group of initial parameters for each element function that approximates the road boundary for each divided area, and taking a sum of the each element function.

2. The image processing device according to claim 1, wherein the function is a quadratic function, the hardware processor sets a linear coefficient initial value of a linear coefficient of the quadratic function on the basis of the identification value of the road boundary recognized in the lateral direction of the image, and the hardware processor iteratively updates the parameters at the predetermined time point by setting forgetting gains of secondary coefficients and linear coefficients of the group of previous parameters at the previous time point to the predetermined time point to values smaller than 1.

3. The image processing device according to claim 1, wherein the hardware processor uses a learned model learned to output a probability value indicating an existence probability of a road boundary for each of coordinates of the image in response to an input of the image to acquire the probability value and update the parameters on the basis of the probability value and the coordinates.

4. The image processing device according to claim 3, wherein the hardware processor iteratively updates the group of initial parameters to minimize an error between a component of the coordinates in a first direction and an estimated value of the component in the first direction calculated on the basis of a component of the coordinates in a second direction.

5. An image processing method comprising:

by a computer, setting an initial value of at least one parameter of a group of initial parameters associated with a function that approximates a road boundary in an image representing an area in front of a mobile object based on a scaling function that gives a straight line passing through an identification value associated with an other parameter of the group of initial parameters and a vanishing point of the image, wherein the image is captured by a camera mounted on the mobile object;

iteratively updating, as a group of updated parameters, the group of initial parameters at a predetermined time point based on a group of previous parameters at a previous time point to the predetermined time point and constraint conditions set for the group of previous parameters; and executing driving control or driving assistance of the mobile object on the basis of the road boundary approximated by the function that is associated with the group of updated parameters, wherein the group of initial parameters associated with the function that approximates the road boundary is iteratively updated by dividing the image at predetermined intervals into areas in a vehicle travel direction, and wherein the group of initial parameters for each element function that approximates the road boundary for each divided area is iteratively updated, and a sum of the each element function is determined.

6. A computer-readable non-transitory storage medium that stores a program causing a computer to execute:

setting an initial value of at least one parameter of a group of initial parameters associated with a function that approximates a road boundary in an image representing an area in front of a mobile object based on a scaling function that gives a straight line passing through an identification value associated with an other parameter of the group of initial parameters and a vanishing point of the image, wherein the image is captured by a camera mounted on the mobile object, iteratively updating, as a group of updated parameters, the group of initial parameters at a predetermined time point based on a group of previous parameters at a previous time point to the predetermined time point and constraint conditions set for the group of previous parameters, and executing driving control or driving assistance of the mobile object based on the road boundary approximated by the function that is associated with the group of updated parameters, wherein the group of initial parameters associated with the function that approximates the road boundary is iteratively updated by dividing the image at predetermined intervals into areas in a vehicle travel direction, and wherein the group of initial parameters for each element function that approximates the road boundary for each divided area is iteratively updated, and a sum of the each element function is determined.

7. An image processing device comprising:

a storage medium configured to store an instruction readable by a computer and a processor that is connected to the storage medium, wherein the processor executes the instruction readable by the computer, thereby setting an initial value of at least one of parameters of a function that approximates a road boundary in an image representing an area in front of a mobile object, captured by a camera mounted on the mobile object, on the basis of identification values of other parameters among the parameters;

iteratively updating the parameters at a predetermined time point on the basis of the parameters at a previous time point to the predetermined time point and constraint conditions set for the parameters; and executing driving control or driving assistance of the mobile object on the basis of the road boundary approximated by the function that has the updated parameters, wherein the processor iteratively updates parameters of a function that approximates a road boundary by dividing the image at predetermined intervals into areas in a vehicle travel direction, iteratively updating the parameters of each element function that approximates the road boundary for each divided area, and taking a sum of the element functions, wherein the function is a quadratic function, the processor sets an initial value of a linear coefficient of the quadratic function on the basis of an identification value of the road boundary recognized in a lateral direction of the image, the processor sets different forgetting gains according to degrees of coefficients of the quadratic function, and the processor iteratively updates the parameters at a predetermined time point by setting forgetting gains of secondary coefficients and the linear coefficients of the parameters at the previous time point to the predetermined time point to values smaller than 1.

* * * * *